United States Patent
Kzaiz et al.

(10) Patent No.: US 11,998,122 B2
(45) Date of Patent: Jun. 4, 2024

(54) CHILD RESTRAINT

(71) Applicant: Britax Römer Kindersicherheit GmbH, Leipheim (DE)

(72) Inventors: Nabil Kzaiz, Günzburg (DE); Martin Haas, Steinheim (DE); Michael Fürstenberg, Ulm (DE); Hubert Kaltenegger, Neu-Ulm (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 0 days.

(21) Appl. No.: 18/238,370

(22) Filed: Aug. 25, 2023

(65) Prior Publication Data

US 2023/0404291 A1 Dec. 21, 2023

Related U.S. Application Data

(63) Continuation of application No. 17/678,380, filed on Feb. 23, 2022, now Pat. No. 11,786,057.

(30) Foreign Application Priority Data

Feb. 24, 2021 (AU) ................ 2021201211

(51) Int. Cl.
*A47D 15/00* (2006.01)
*A47D 13/02* (2006.01)

(52) U.S. Cl.
CPC ......... *A47D 15/006* (2013.01); *A47D 13/025* (2013.01)

(58) Field of Classification Search
CPC .... A47D 13/025; A47D 15/006; A47D 13/02; A47C 7/725; B60N 2/2821; B60N 2/2845; B60N 2/2848; B60N 2002/0272
See application file for complete search history.

(56) References Cited

U.S. PATENT DOCUMENTS

| | | | |
|---|---|---|---|
| 6,126,233 A * | 10/2000 | Gaetano | B60N 2/286 297/217.6 |
| 7,201,444 B2 | 4/2007 | Schimmoller et al. | |
| 8,113,579 B2 | 2/2012 | Fiore, Jr. et al. | |
| 9,663,004 B2 | 3/2017 | Perrin et al. | |
| 10,086,752 B1 | 10/2018 | Bobo et al. | |
| 2005/0275258 A1 | 12/2005 | Patterson et al. | |
| 2005/0275276 A1 | 12/2005 | Patterson et al. | |

(Continued)

FOREIGN PATENT DOCUMENTS

| | | |
|---|---|---|
| CA | 2414435 A1 | 5/2004 |
| DE | 10037260 C2 | 7/2002 |
| DE | 102014007619 B4 | 7/2018 |

(Continued)

*Primary Examiner* — Milton Nelson, Jr.
(74) *Attorney, Agent, or Firm* — K&L Gates LLP

(57) ABSTRACT

A child restraint configured to be securable to and separable from a base installed in a vehicle, the child restraint comprising an illuminator positioned on an external portion of the child restraint, configured to operate in a first mode, illuminating a first region external to the child restraint wherein, in the event that the child restraint is not secured to the base, and the child restraint is moved, the illuminator will be activated in its first mode, illuminating the first region external to the child restraint for the purpose of aiding securement to the base, and wherein in the event that the child restraint is secured to the base, the first mode will be deactivated.

20 Claims, 5 Drawing Sheets

(56) References Cited

U.S. PATENT DOCUMENTS

2010/0301645 A1* 12/2010 Uwnawich .......... B60N 2/2863
297/183.6

FOREIGN PATENT DOCUMENTS

| EP | 2834101 B1 | 10/2016 |
| EP | 2269861 B1 | 12/2016 |
| EP | 3160794 B1 | 5/2018 |
| EP | 2433832 B1 | 10/2018 |
| EP | 3434511 B1 | 11/2019 |
| WO | 2006020604 A2 | 2/2006 |

* cited by examiner

CHILD RESTRAINT

CROSS-REFERENCE TO RELATED APPLICATIONS

The present application is a continuation of U.S. patent application Ser. No. 17/678,380, entitled "Child Restraint" and filed Feb. 23, 2022, which claims priority to AU Patent Application No. 2021201211, filed Feb. 24, 2021, the disclosures of which are hereby incorporated by reference in their entirety.

TECHNICAL FIELD

The present invention relates to a child restraint for a vehicle. In a particular form the present invention relates to a child restraint with integrated lighting.

BACKGROUND

Child restraints (including infant carriers) are configured to be installed within a vehicle and may be held in place by a vehicle seat belt, or alternate connecting means, such as ISOFIX. Child restraints are sometimes configured to be securable to and separable from a base that remains secured in a vehicle via seat belt or alternative connecting means. Many of these infant carriers are also configured to be securable to and separable from strollers, either directly or through the use of adapters that enable cooperative engagement of infant carriers and strollers made by different manufacturers.

Securement of infant carriers to bases and strollers can be fiddly and cumbersome, and particularly daunting and stressful for first time parents or users of the equipment, where correct alignment of latches and adapters with their respective sockets/receivers is required. This task is made even more difficult in low light environments, or in instances where it is undesirable to illuminate the vehicle so as not to disturb or wake a sleeping child.

It is against this background that the present disclosure has been developed.

SUMMARY

According to a first aspect, there is provided a child restraint configured to be securable to and separable from a base installed in a vehicle, the child restraint comprising an illuminator positioned on an external portion of the child restraint, configured to operate in a first mode, illuminating a first region external to the child restraint, wherein, in the event that the child restraint is not secured to the base, and the child restraint is moved, the illuminator will be activated in its first mode, illuminating the first region external to the child restraint for the purpose of aiding securement to the base, and wherein in the event that the child restraint is secured to the base, the first mode will be deactivated.

In one form, the child restraint further comprises a movement sensor for detecting movement of the child restraint.

In one form, the movement sensor is a tilt sensor.

In one form, the child restraint further comprises a sensor for detecting whether or not the child restraint has been secured to the base.

In one form, the sensor for detecting whether or not the child restraint has been secured to the base, is in the form of a switch, which is actuated when the child restraint is secured to the base.

In one form, the child restraint is further configured to be securable to and separable from a stroller, wherein in the event that the child restraint is not secured to the stroller, and the child restraint is moved, the illuminator will be activated in its first mode, illuminating the first region external to the child restraint for the purpose of aiding securement to the stroller, and wherein in the event that the child restraint is secured to the stroller, the first mode will be deactivated.

In one form, the child restraint further comprises a sensor for detecting whether or not the child restraint has been secured to the stroller.

In one form, the sensor for detecting whether or not the child restraint has been secured to the stroller is in the form of a switch, which is actuated when the child restraint is secured to the stroller.

In one form, the illuminator is further configured to operate in a second mode, illuminating a second region external to the child restraint, and wherein, in the event that the child restraint is secured to the stroller, and the child restraint is moved, the illuminator will be activated in its second mode.

In one form, the second region external to the child restraint is a region fore and aft of the child restraint.

In one form, the first region external to the child restraint is a region below the child restraint.

In one form, the child restraint further comprises a sensor for detecting ambient light levels, wherein, in the event that the ambient light levels exceed a predetermined amount, the illuminator will be deactivated.

In one form, the child restraint is an infant carrier.

According to a second aspect, there is provided a child restraint configured to be securable to and separable from a base installed in a vehicle, the child restraint comprising an illuminator positioned near a connection point of the child restraint, configured to operate in a first mode, illuminating a first region near the connection point of the child restraint, wherein, in the event that the child restraint is not secured to the base, and the child restraint is moved, the illuminator will be activated in its first mode, illuminating the first region near the connection point of the child restraint for the purpose of aiding securement to the base, and wherein in the event that the child restraint is secured to the base, the first mode will be deactivated.

In one form, the child restraint further comprises a movement sensor for detecting movement of the child restraint.

In one form, the movement sensor is a tilt sensor.

In one form, the child restraint further comprises a sensor for detecting whether or not the child restraint has been secured to the base.

In one form, the sensor for detecting whether or not the child restraint has been secured to the base, is in the form of a switch, which is actuated when the child restraint is secured to the base.

In one form, the child restraint is further configured to be securable to and separable from a stroller, wherein in the event that the child restraint is not secured to the stroller, and the child restraint is moved, the illuminator will be activated in its first mode, illuminating the near the connection point of the child restraint for the purpose of aiding securement to the stroller, and wherein in the event that the child restraint is secured to the stroller, the first mode will be deactivated.

In one form, the child restraint further comprises a sensor for detecting whether or not the child restraint has been secured to the stroller.

In one form, the sensor for detecting whether or not the child restraint has been secured to the stroller is in the form of a switch, which is actuated when the child restraint is secured to the stroller.

In one form, the illuminator is further configured to operate in a second mode, illuminating a second region near the connection point of the child restraint, and wherein, in the event that the child restraint is secured to the stroller, and the child restraint is moved, the illuminator will be activated in its second mode.

In one form, the second region near the connection point of the child restraint is a region fore and aft of the child restraint.

In one form, the first region near the connection point of the child restraint is a region below the child restraint.

In one form, the child restraint further comprises a sensor for detecting ambient light levels, wherein, in the event that the ambient light levels exceed a predetermined amount, the illuminator will be deactivated.

In one form, the child restraint is an infant carrier.

In one form, the illuminator comprises a housing, a plurality of light emitting diodes (LEDs) and circuitry.

In one form, the child restraint includes two illuminators.

In one form, each of the two illuminators is located on opposite sides of the child restraint.

In one form, the movement sensor is an accelerometer.

In one form, the movement sensor is an infra-red sensor.

In one form, the movement sensor is an occupant presence sensor.

In one form, the child restraint further comprises a battery assembly to power the illuminator, wherein the battery assembly comprises a rechargeable battery and a battery management system provided within a housing

BRIEF DESCRIPTION OF DRAWINGS

Embodiments of the present invention will be discussed with reference to the accompanying drawings wherein.

DETAILED DESCRIPTION

Figure 5:
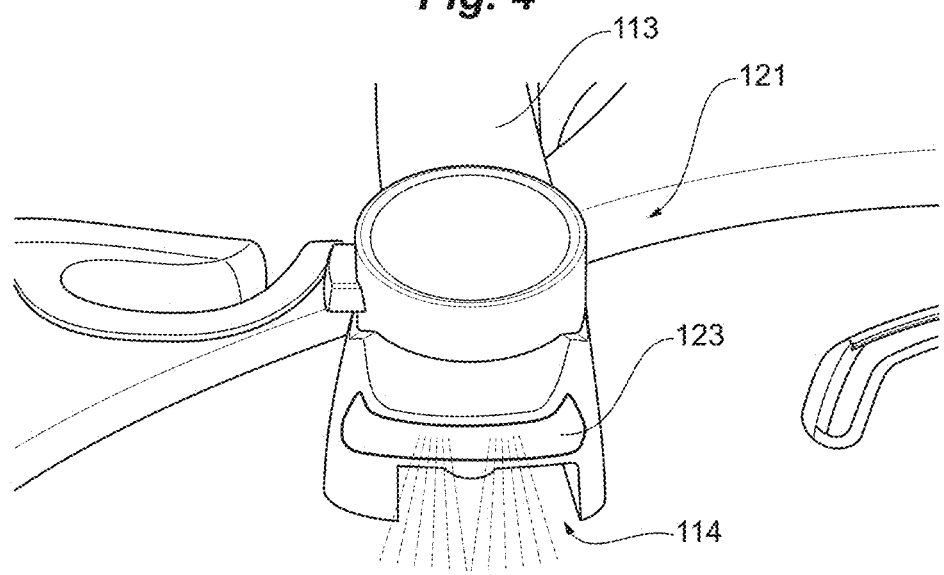
FIG. 5 is a detailed view of the external lights activated in a first "installation mode"
Figure 6:
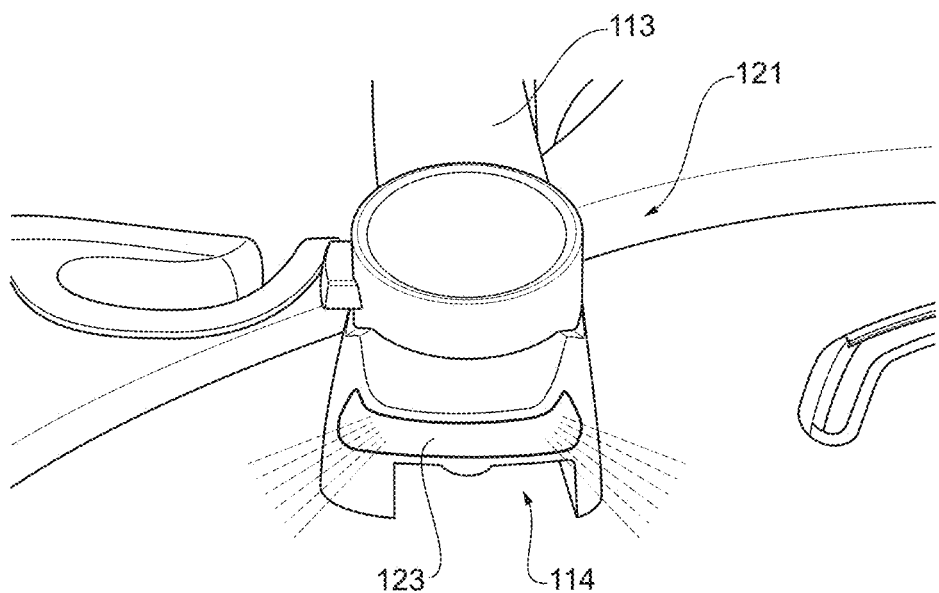
FIG. 6 is a detailed view of the external lights activated in a second "safety mode"
Figure 7:
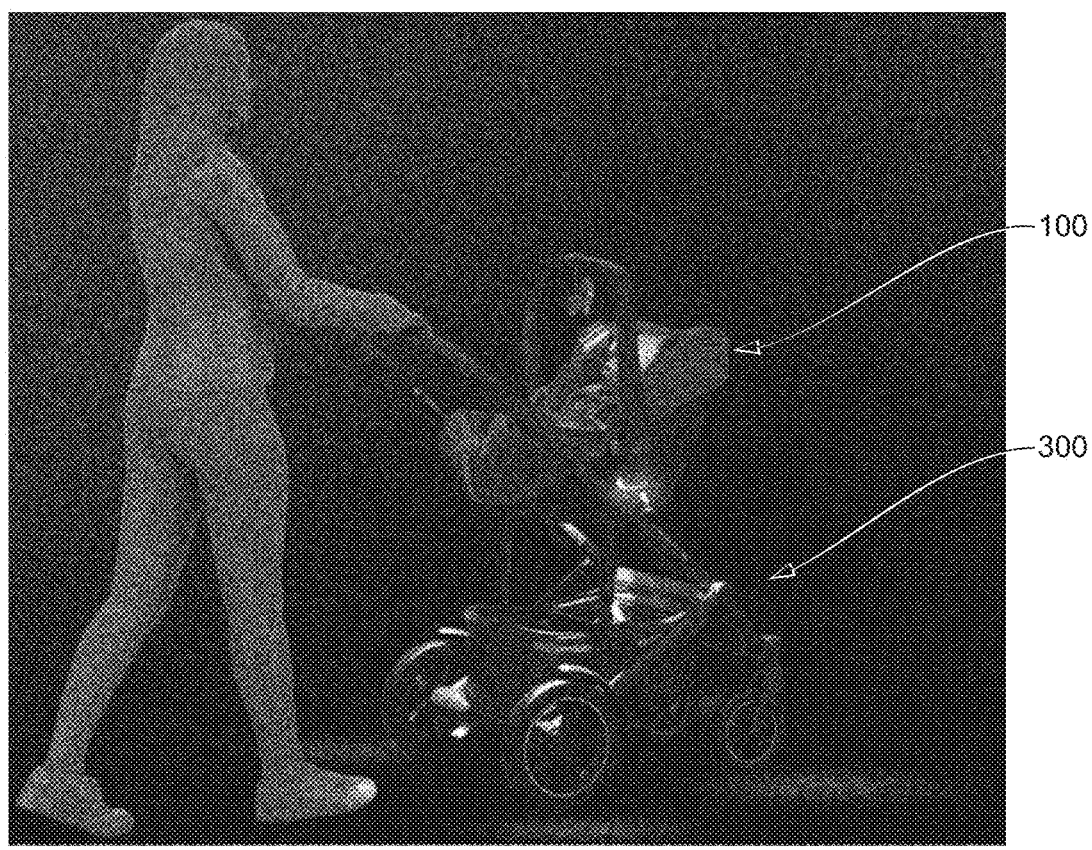
FIG. 7 is a perspective view of the infant carrier of FIG. 1 installed on a stroller.

Referring now to FIGS. 1 to 7, where there is shown a child restraint in the form of an infant carrier 100 configured to be securable to and separable from a base 200 installed in a vehicle. The infant carrier 100 comprises at least one illuminator 120 positioned on an external portion of the infant carrier 100, configured to operate in a first mode (or installation mode), illuminating a first region external to the infant carrier 100 (as best shown in FIG. 5). The infant carrier 100 also comprises a movement sensor 140 for detecting movement of the infant carrier 100 and a sensor 160 for detecting whether or not the infant carrier 100 has been secured to the base 200. In the event that the infant carrier 100 has not been secured to the base 200 and the infant carrier 100 is moved, the illuminator 120 activates the first mode, illuminating the first region external to the infant carrier 100 for the purpose of aiding securement to the base 200. In the event that the infant carrier 100 is secured to the base 200, the first mode will be deactivated.

While in the embodiment shown, the first region external to the child restraint is a region below the child restraint, it will however be appreciated that in alternative embodiments, the size and directionality of the first region may differ, but still fall within the scope of this disclosure. For example, the first region may include a region directly below as well as a region fore and aft, and/or left and right of the infant carrier.

The movement sensor 140 for detecting movement of the infant carrier 100 is in the form of a tilt sensor. It will be appreciated that in alternative embodiments, different types of movement sensors could be employed, such as accelerometers, infra-red sensors or occupant presence sensors.

The sensor 160 for detecting whether or not the infant carrier 100 has been secured to the base 200 is in the form of a first switch 161 which is actuated when the infant carrier 100 is secured to the base 200. The switch 161 may be positioned on or near the underside of the infant carrier 100, such that a portion of the base 200 will bear against and activate the switch 161 during securement.

The infant carrier 100 also comprises at least one sensor 150 for detecting ambient light levels in the form of an ambient light sensor 151, wherein in the event that ambient light levels exceed a pre-determined amount, the illuminator will be deactivated.

The infant carrier 100 is also configured to be securable to and separable from a stroller 300, and also comprises a sensor 170 for detecting whether or not the infant carrier 100 has been secured to the stroller 300. In the event that the infant carrier 100 has not been secured to the stroller 300 and the infant carrier 100 is moved, the illuminator 120 will also activate the first mode, illuminating the region below the infant carrier 100 for the purpose of aiding securement to the stroller 300. In the event that the infant carrier 100 is secured to the stroller 300, the first mode will also be deactivated.

The illuminator 120 is further configured to operate in a second mode (or safety mode), illuminating a second region external to the infant carrier 100, and wherein, in the event that the infant carrier 100 is secured to the stroller 300, the illuminator 120 will activate the second mode in order to improve the visibility of the stroller 300 and infant carrier 100.

While in the embodiment shown, the second region external to the child restraint is a region fore and aft of the child restraint, it will however be appreciated that in alternative embodiments, the size and directionality of the second region may differ, but still fall within the scope of this disclosure. For example, the second region may include a region fore and aft, and/or left and right of the infant carrier.

The sensor 170 for detecting whether or not the infant carrier 100 has been secured to the stroller 300 is in the form of a second switch 171 which is actuated when the infant carrier 100 is secured to the stroller. The second switch 171 may be positioned within or near where the stroller 300 connects with the infant carrier 100, such that a portion of the stroller 300 will bear against and activate the switch 171 during securement.

While in the embodiments described, the sensors used for detecting whether or not the infant carrier is secured to the base or the stroller are in the form of a switch, it will be appreciated that alternate sensing arrangements could be employed, and are intended to fall within the scope of this disclosure.

Figure 1:
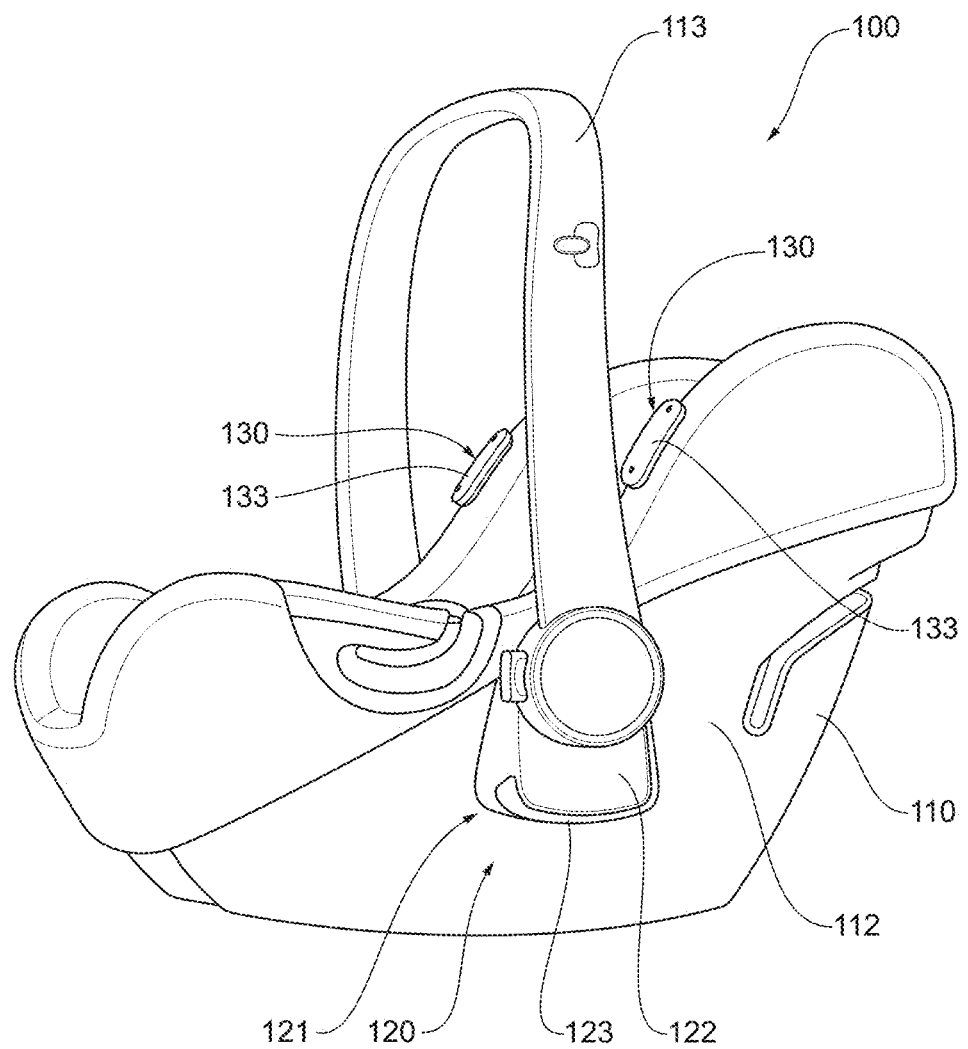
FIG. 1 is a perspective view of a child restraint in the form of an infant carrier, according to an embodiment.

With reference to FIG. 1, it can be seen that the infant carrier 100 comprises a body 110 providing a support surface for an occupant. The illuminator 120 takes the form of an external light assembly 121 provided on either side of the body. As shown schematically in FIGS. 2 and 3, the external light assembly 121 comprises a housing 122, four light emitting diodes (LEDs) 124a, 124b, a lens 123, and associated circuitry. In the embodiment shown, the housing 122 forms part of a structure secured to the sides 112 of the body 110, providing a mounting location for a carry handle 113 for the infant carrier 100, as well as a receiving socket 114 for securing the infant carrier 100 to the stroller 300 directly or via an adapter.

The LEDs 124a, 124b are arranged in a row such that when operating in the installation mode, the two inner LEDs (the installation lights) 124a are activated, and when operating in the safety mode, the two outer LEDs (the safety lights) 124b are activated. It will be appreciated that the installation lights 124a are oriented downward, and the safety lights 124b are oriented fore and aft respectively, in order to achieve the desired lighting outcome.

Referring now to FIGS. 1 to 4, it can be seen that the infant carrier 100 also comprises a pair of internal light assemblies 130 provided on either side of the body 110. As shown schematically in FIGS. 2 and 3, each internal light assembly 130 comprises a housing 131, four LEDs 132, a lens, two user inputs in the form of upper and lower buttons 134, 135 and associated circuitry.

The internal LEDs (the internal lights) 132 are arranged in a row and oriented such that when activated, they are intended to illuminate the occupant of the infant carrier 100. The internal lights 132 are able to be operated by virtue of the upper button 134, and the installation and safety lights 124a, 124b are able to be operated by virtue of the lower button 135, their operation will be described in further detail below.

It will be appreciated that the type, number, position and orientation of the internal, installation and safety lights 132, 124a, 124b may vary from what is described, while still achieving the desired lighting outcome.

Figure 2:
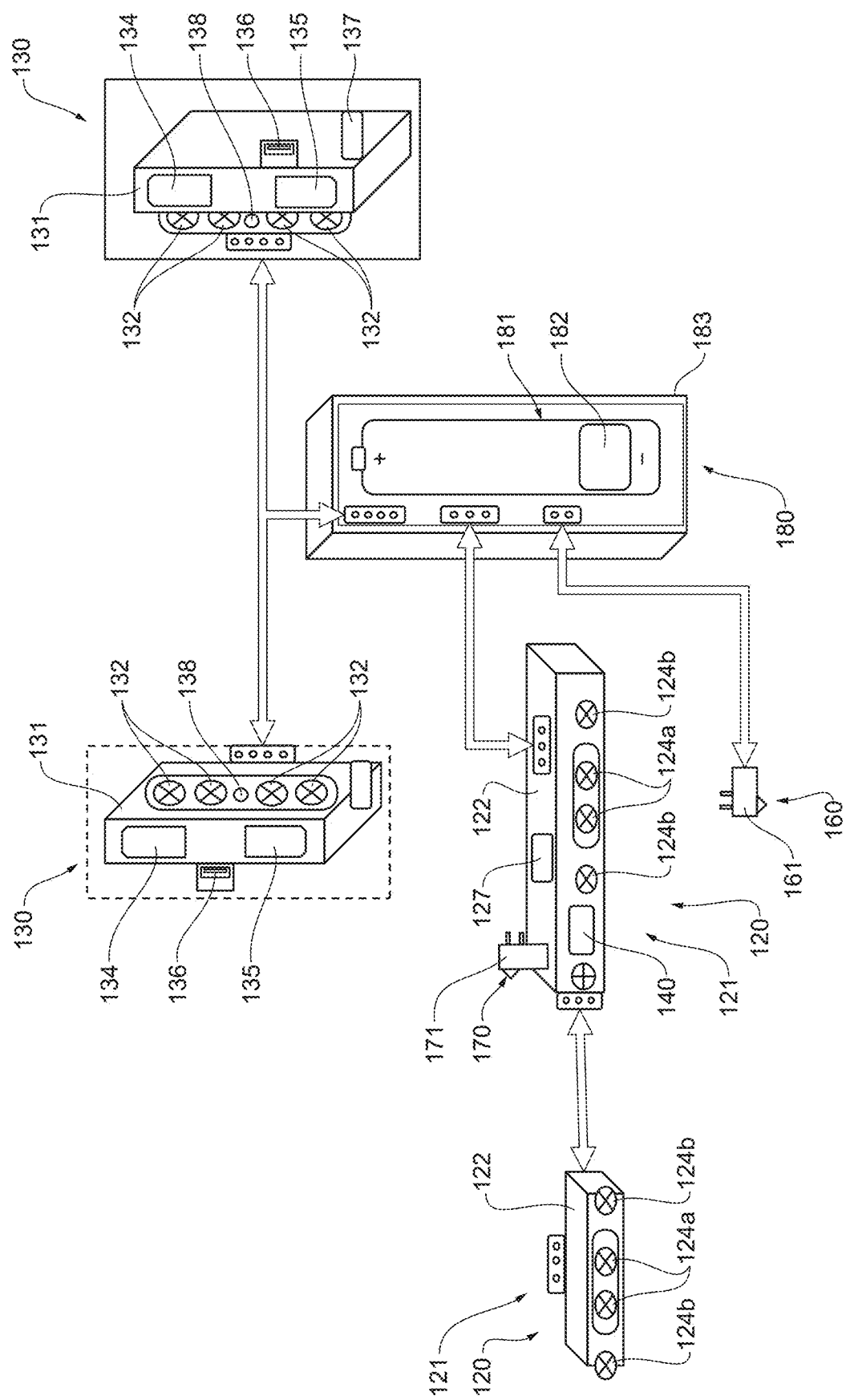
FIG. 2 is a schematic of a lighting system for the infant carrier of FIG. 1, according to an embodiment.
Figure 3:
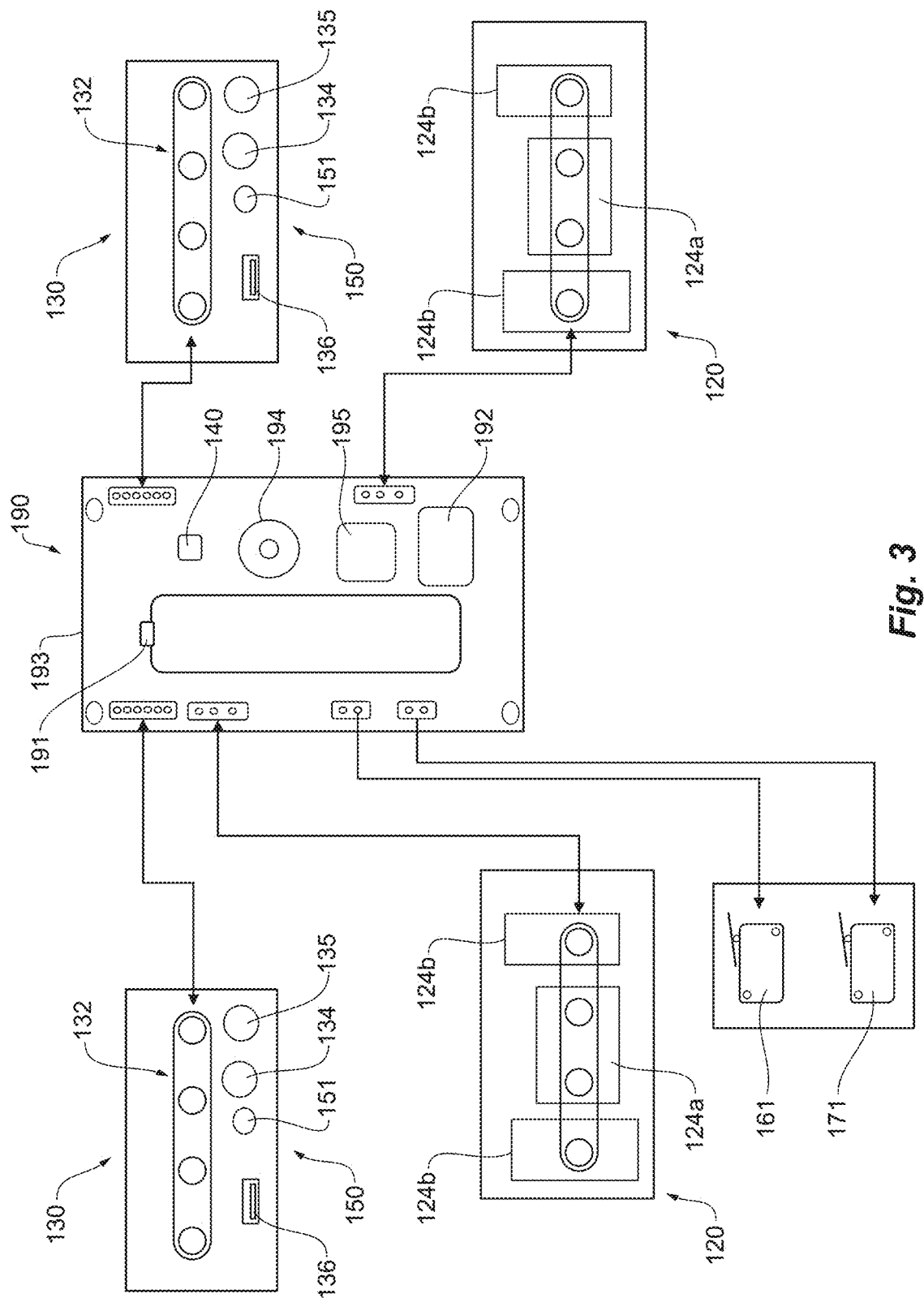
FIG. 3 is a schematic of a lighting system for the infant carrier of FIG. 1, according to an alternate embodiment.
Figure 4:
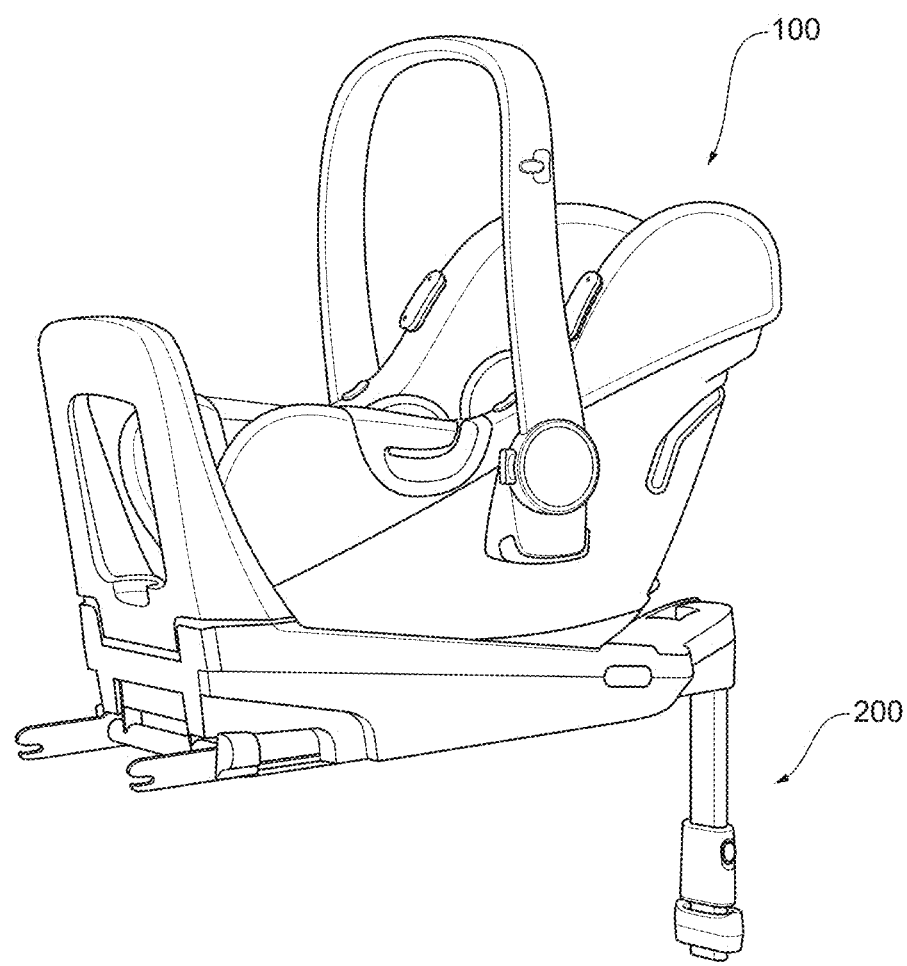
FIG. 4 is a perspective view of the infant carrier of FIG. 1 installed on a base.

There are a number of different ways that the internal and external light assemblies and associated switches and sensors can be configured, as evidenced by the two alternate schematics presented in FIGS. 2 and 3.

With reference to FIG. 2, it can be seen that the light arrangement may comprise the two internal light assemblies 130, the two external light assemblies 121 and a battery assembly 180, wherein the battery assembly 180 comprises a rechargeable battery 181 and battery management system 182 provided within a housing 183. In addition to the internal lights 132, the internal light assemblies 130 may also comprise charging ports 136, on board microcontrollers 137 and battery status indicators 138. The internal light assemblies 130 are then connected in parallel to the battery assembly 180. It can also be seen that in this arrangement, a first external light assembly 121 is connected to the battery assembly 180, and in addition to the safety and installation lights 124a, 124b, also comprises the tilt sensor 140, light sensor 151, second switch 171 and a microcontroller 127. It can be seen that the second external light assembly 121 is then connected to the first light assembly 121. The first switch 161 is directly connected to the battery assembly 180.

With reference to FIG. 3, it can be seen that the light arrangement may comprise the two internal light assemblies 130, the two external light assemblies 121 and an electronic control unit (ECU) 190 electronically connected to the two internal and two external light assemblies 130, 121. The ECU 190 is provided within a housing 193 which may be positioned on the underside of the infant carrier 100, and comprises a rechargeable battery 191 and battery management system 192, tilt sensor 140, speaker 194, microcontroller 195 and associated circuitry for receiving and/or sending signals to the internal and external light assemblies 130, 121 as well as the first and second switches 161, 171. In addition to the internal lights 132, the internal light assemblies 130 may also comprise charging ports 136 and ambient light sensors 151. The internal and external light assemblies 130, 121 and first and second switches 161, 171 are then individually connected to the ECU 190. While in the embodiment shown in FIG. 2, a visual battery status indicator is provided, FIG. 3 provides a speaker 194 which can provide an acoustic signal.

It will be appreciated that these two arrangements offer one option where the internal and external lights are centrally controlled by the ECU 190 (as per FIG. 3) or self-controlled as stand-alone modules that are simply powered by the battery housing 180 (as per FIG. 2). It will however be appreciated that further configurations are also possible, for instance, in an alternate embodiment, a child restraint may be provided with only interior or exterior lights, or in a further embodiment, the number of interior and exterior light assemblies may vary.

While in the embodiments shown, communication between the various components occurs via a cable link, it will be appreciated that in alternate embodiments, communication may occur via fibre optics, infra-red, or various wireless communication protocols such as Wi-Fi or Bluetooth.

An example of how the internal lights 132 may be operated will now be described. The internal lights 132 are operated manually with either of the upper buttons 134. A short press of either upper button 134 will switch on both sets of internal lights 132, with further short presses within a predetermined time period of 10 seconds, increasing the intensity of the lights. If a short press is performed after the predetermined time period, the internal lights will switch off.

The internal lights 132 also feature an auto-off function, where at any intensity, a long press on either upper button 134 will active the auto-off timer function. Once activated a countdown will start and the internal lights will switch off automatically after 2 minutes. It will be appreciated that this function gives an operator enough time to ensure that the child has been buckled in to the carrier, to walk to the drivers seat, sit in the car, start driving and have the lights switch off automatically.

An example of how the external lights 124a, 124b may be operated will now be described. The default mode of operation is an automatic mode, where the system will detect darkness/brightness, movement/non-movement and usage on base or stroller and activate/deactivate the lights accordingly.

A short press on either of the lower buttons 135 will set the system to automatic mode. In a bright environment, both the installation and safety lights 124a, 124b remain off (or will be switched off when moving from a dark environment to a bright environment). When the infant carrier is being moved and it is dark, the installation lights 124a will turn on and the safety lights 124b will remain off. If after a predetermined period of time of no movement, the installation lights 124a will switch off again (time-out). When the infant carrier 100 is secured to a stroller 300 in the dark, the installation lights 124*a* will switch off and the safety lights 124*b* will switch on. If after a predetermined period of time of no movement, the safety lights 124*b* will turn off (time out). When the infant carrier 100 is separated from the stroller 300, the safety lights 124*b* will switch off and the installation lights will turn on 124*a*. When the infant carrier 100 is secured to the base 200 in the vehicle in the dark, the installation lights 124*a* will switch off.

It is also possible to switch to a manual mode of operation, where, when in automatic mode, a first short press on the lower button 135 will activate the manual mode and both the safety and installation lights 124*a*, 124*b* will turn on (regardless of bright or dark environment). A second short press within a predetermined time period of seconds on the lower button 135 will lead to safety lights 124*b* on, installation light 124*a* off. A third short press within a predetermined time period of 10 seconds on the lower button 135 will lead to safety light 124*b* off, installation light 124*a* on. A fourth short press within a predetermined time period of 10 seconds on the lower button 135 will lead back to auto mode. If in manual mode and the infant carrier 100 is released from the stroller 300 or base 200, it will revert to automatic mode. If in manual mode, after the predetermined time period of 10 seconds, a short press on the lower button 135 will revert back to automatic mode.

It is also possible to turn off the exterior lights 124*a*, 124*b* entirely, which is recommended for long periods of non-use. This is achieved by a long press on the lower button.

In the embodiments shown and described, the interior and exterior lights were operated using buttons located on the interior light assemblies, it will be appreciated that numerous other arrangements and modes of operation may be applied, for example the location or number of buttons may vary. Alternatively, the lights may be operated by means of an "on-board" user interface such as a touch screen, further still the lights may be operated by an "external" user interface such as an app on a connected smart device, a remote control, voice control device, or integrated as part of the vehicle entertainment and control system.

In the embodiments shown and described, the infant carrier 100 features an integrated lighting arrangement, however it will be appreciated that in alternate embodiments, the various components making up the lighting arrangement could be retrofitted to an existing seat or infant carrier. It will also be appreciated that the above disclosure does not have to be limited to an infant carrier.

While a child restraint in the form of an infant carrier has been shown and described, it will be appreciated that all or at least some of the above described features could also be employed on another type of child restraint, such as a forward and/or rearward facing restraint.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A child restraint configured to be securable to and separable from a base installed in a vehicle, the child restraint comprising:
    an illuminator positioned near a connection point of the child restraint, configured to operate in a first mode, illuminating a first region near the connection point of the child restraint;
    wherein, in the event that the child restraint is not secured to the base, and the child restraint is moved, the illuminator will be activated in its first mode, illuminating the first region near the connection point of the child restraint for the purpose of aiding securement to the base, and wherein in the event that the child restraint is secured to the base, the first mode will be deactivated.

2. The child restraint as claimed in claim 1, further comprising a movement sensor for detecting movement of the child restraint.

3. The child restraint as claimed in claim 2, wherein the movement sensor is a tilt sensor.

4. The child restraint as claimed in claim 2, further comprising a sensor for detecting whether or not the child restraint has been secured to the base.

5. The child restraint as claimed in claim 4, wherein the sensor for detecting whether or not the child restraint has been secured to the base, is in the form of a switch, which is actuated when the child restraint is secured to the base.

6. The child restraint as claimed in claim 2, further configured to be securable to and separable from a stroller, wherein in the event that the child restraint is not secured to the stroller, and the child restraint is moved, the illuminator will be activated in its first mode, illuminating the near the connection point of the child restraint for the purpose of aiding securement to the stroller, and wherein in the event that the child restraint is secured to the stroller, the first mode will be deactivated.

7. The child restraint as claimed in claim 6, further comprising a sensor for detecting whether or not the child restraint has been secured to the stroller.

8. The child restraint as claimed in claim 7, wherein the sensor for detecting whether or not the child restraint has been secured to the stroller is in the form of a switch, which is actuated when the child restraint is secured to the stroller.

9. The child restraint as claimed in claim 6, wherein the illuminator is further configured to operate in a second mode, illuminating a second region near the connection point of the child restraint, and wherein, in the event that the child restraint is secured to the stroller, and the child restraint is moved, the illuminator will be activated in its second mode.

10. The child restraint as claimed in claim 9, wherein the second region near the connection point of the child restraint is a region fore and aft of the child restraint.

11. The child restraint as claimed in claim 2, wherein the movement sensor is an accelerometer.

12. The child restraint as claimed in claim 2, wherein the movement sensor is an infrared sensor.

13. The child restraint as claimed in claim 2, wherein the movement sensor is an occupant presence sensor.

14. The child restraint as claimed in claim 1, wherein the illuminator comprises a housing, a plurality of light emitting diodes (LEDs) and circuitry.

15. The child restraint as claimed in claim 1, wherein the child restraint includes two illuminators.

16. The child restraint as claimed in claim 15, wherein each of the two illuminators is located on opposite sides of the child restraint.

17. The child restraint as claimed in claim 1, wherein the first region near the connection point of the child restraint is a region below the child restraint.

18. The child restraint as claimed in claim 1, further comprising a sensor for detecting ambient light levels, wherein, in the event that the ambient light levels exceed a predetermined amount, the illuminator will be deactivated.

19. The child restraint as claimed in claim 1, wherein the child restraint is an infant carrier.

20. The child restraint as claimed in claim 1, further comprising a battery assembly to power the illuminator, wherein the battery assembly comprises a rechargeable battery and a battery management system provided within a housing.

* * * * *